Figure 1:
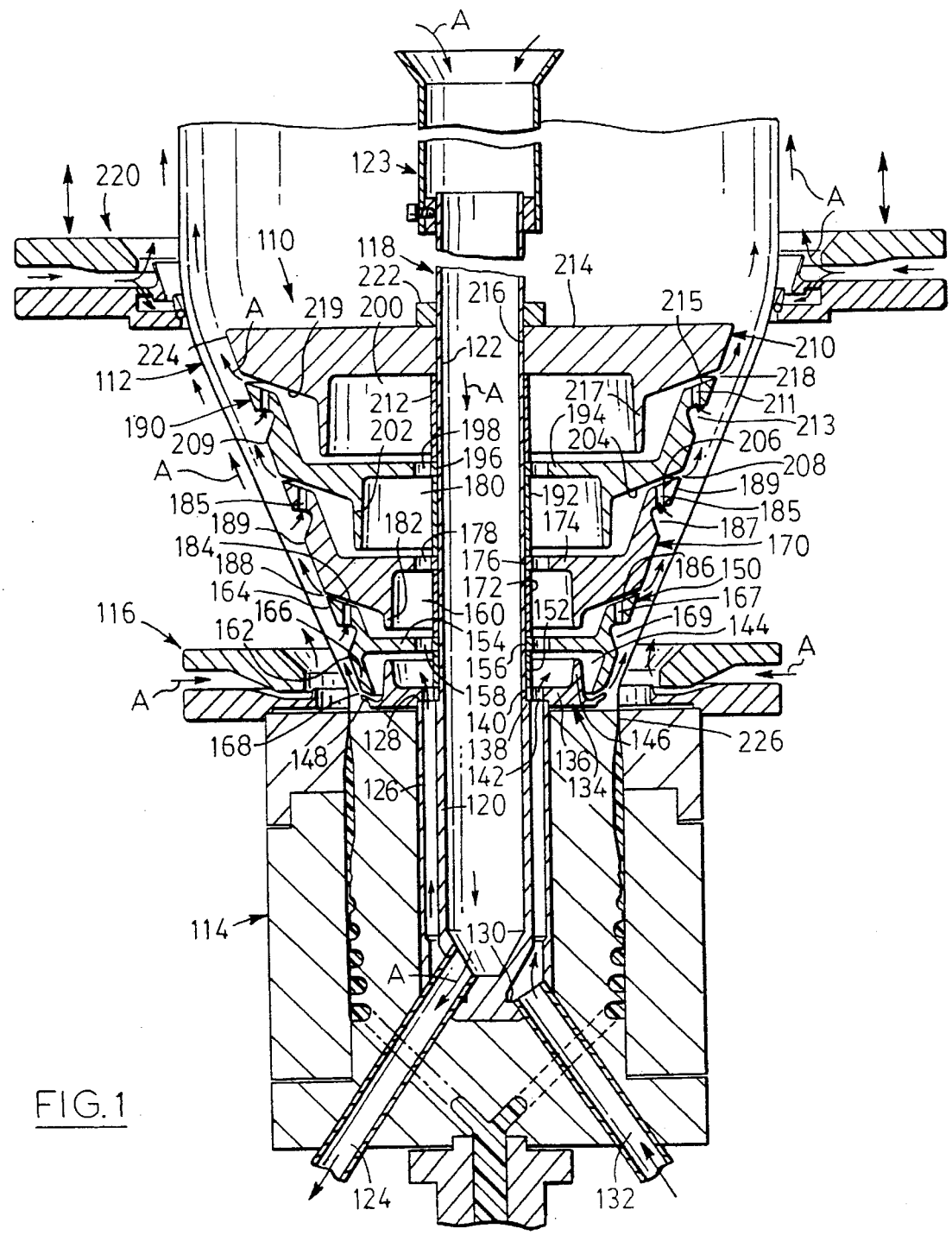

United States Patent [19]
Planeta

[11] Patent Number: 5,576,029
[45] Date of Patent: Nov. 19, 1996

[54] INTERNAL COOLING AIR SUPPLY ASSEMBLY

[76] Inventor: Mirek Planeta, 170 Traders Blvd., Mississauga, Ont., Canada, L4Z 1W7

[21] Appl. No.: 458,275

[22] Filed: Jun. 2, 1995

[51] Int. Cl.[6] ................................................ B29C 47/88
[52] U.S. Cl. ........................ 425/72.1; 425/384; 425/445
[58] Field of Search ................................ 425/72.1, 526, 425/384, 522, 445; 264/209.3, 211.12

[56] References Cited

U.S. PATENT DOCUMENTS

| | | | |
|---|---|---|---|
| 3,898,028 | 4/1975 | Upmeier | 425/72.1 |
| 4,236,884 | 12/1980 | Schott, Jr. | 425/72.1 |
| 4,265,853 | 5/1981 | Havens | 425/72.1 |
| 4,473,527 | 9/1984 | Fujisaki et al. | 425/72.1 |
| 4,601,649 | 7/1986 | Upmeier | 425/72.1 |
| 4,606,879 | 8/1986 | Cerisano | 425/72.1 |
| 4,643,657 | 2/1987 | Achelpohl et al. | 425/72.1 |
| 4,678,417 | 7/1987 | Upmeier | 425/72.1 |
| 4,955,802 | 9/1990 | Halter et al. | 425/72.1 |

FOREIGN PATENT DOCUMENTS

| | | | |
|---|---|---|---|
| 2736811 | 3/1978 | Germany | 425/72.1 |
| 56-4433 | 1/1981 | Japan | 425/72.1 |

Primary Examiner—Khanh P. Nguyen
Attorney, Agent, or Firm—Rogers & Scott

[57] ABSTRACT

An internal cooling air supply assembly has a lower annular member mountable on an annular die so as to be within extruded tubular plastic film as the film leaves the die. An intermediate annular member is positionable above the lower annular member with an air removal chimney extending upwardly therethrough, the intermediate annular member forming a first chamber with the lower annular member and having an annular lower edge spaced from and co-operating with an annular upper edge of the lower annular member to form a first cooling air outlet from the first chamber. The intermediate annular member has a transfer passage for transferring cooling air from the first chamber to the interior of the intermediate annular member. A first upper annular member is positionable above the intermediate annular member with the air removal chimney extending upwardly therethrough, the upper annular member forming a second chamber with the intermediate annular member and having an annular lower edge spaced from and co-operating with an upper annular edge of the intermediate annular member to form a second cooling air outlet from the second chamber. The intermediate annular member has a first series of circumferentially spaced upwardly directed passages extending from the exterior thereof to the upper annular edge thereof.

10 Claims, 3 Drawing Sheets

INTERNAL COOLING AIR SUPPLY ASSEMBLY

This invention relates to internal cooling air supply assemblies for supplying air to the interior of an extruded plastic film after the film has been extruded from an annular die at an elevated temperature.

Many different types of internal cooling air assemblies for tubular plastic films are known, but there is still a need for an improved internal cooling air assembly which more satisfactorily cools the interior of the tubular film and which is also mechanically simple and easy to install and remove.

It is therefore an object of the invention to provide such an improved internal cooling air assembly.

According to the present invention, an internal cooling air supply assembly comprises a lower annular member mountable on an annular die so as to be within extruded tubular plastic film as the film leaves the die, said die having an air supply passage to supply cooling air to the interior of the lower annular member and an air removal passage including an air removal chimney extending upwardly from the die through the lower annular member to remove air from the interior of the tubular plastic film.

An intermediate annular member is positionable above the lower annular member with the air removal chimney extending upwardly therethrough, said intermediate annular member forming a first chamber with the lower annular member and having an annular lower edge spaced from and co-operating with an annular upper edge of the lower annular member to form a first cooling air outlet from said first chamber, said intermediate annular member having a transfer passage for transferring cooling air from the first chamber to the interior of the intermediate annular member.

A first upper annular member is positionable above the intermediate annular member with the air removal chimney extending upwardly therethrough, said upper annular member forming a second chamber with the intermediate annular member and having an annular lower edge spaced from and co-operating with an upper annular edge of the intermediate annular member to form a second cooling air outlet from the second chamber.

The intermediate annular member has a first series of circumferentially spaced upwardly directed passages extending from the exterior thereof to said upper annular edge thereof whereby in use cooling air is directed onto the interior of the film from the first and second chambers through the first and second cooling air outlets respectively and cooling air passing through the second cooling air outlet draws cooling air through said first series of inwardly directed passages from the exterior of the intermediate annular member to create suction which draws the film close to the intermediate annular member.

The lower, intermediate and first upper annular members may form an upwardly and outwardly inclined side wall through which the first and second cooling outlets pass whereby the film bubble has an outwardly diverging shape as it passes thereby.

Alternatively, the lower, intermediate and first upper annular members may form an upwardly extending vertical side wall through which the first and second cooling air outlets pass whereby the film has a vertical cylindrical shape as it passes thereby.

In another alternative, the lower, intermediate and first upper annular members may form an upwardly and inwardly extending side wall through which the first and second cooling outlets pass whereby the film has an upwardly converging shape as it passes thereby.

The present invention also provides cooling air supply apparatus for supplying cooling air to an extruded tubular plastic film after the film has been extruded from an annular die at an elevated temperature, the air supply apparatus comprising an internal cooling air supply assembly mounted on an annular die so as to be within extruded tubular plastic film as the film leaves the die, the die having an air supply passage to supply cooling air to the interior of the internal cooling air supply assembly and an air removal passage including an air removal chimney extending upwardly from the die through the internal cooling air supply assembly to remove air from the interior of the tubular plastic film, the internal cooling air supply assembly having at least an annular cooling air outlet through which cooling air passes on the interior of the internal cooling air supply assembly onto the interior surface of the tubular plastic film.

The air supply apparatus also includes a lower external air ring assembly mounted on the die so as to surround the tubular plastic film as the film leaves the die and supply cooling air onto the exterior surface of the tubular plastic film, and an upper external cooling air ring assembly mounted adjacent an upper end of the internal cooling air supply assembly so as to surround the tubular plastic film and supply cooling air to the exterior surface thereof.

The chimney may have an upper end portion which is adjustable in height to accommodate internal cooling air supply assemblies of different heights, and the upper external air ring assembly may be vertically movable to accommodate changes of internal cooling air supply assembly from one height to another.

The internal cooling air supply assembly may have an outer wall which extends in an upwardly and outwardly inclined direction adjacent the tubular plastic film. Alternatively, the outer wall may extend in a substantially vertical direction or an upwardly and inwardly inclined direction.

Figure 2:
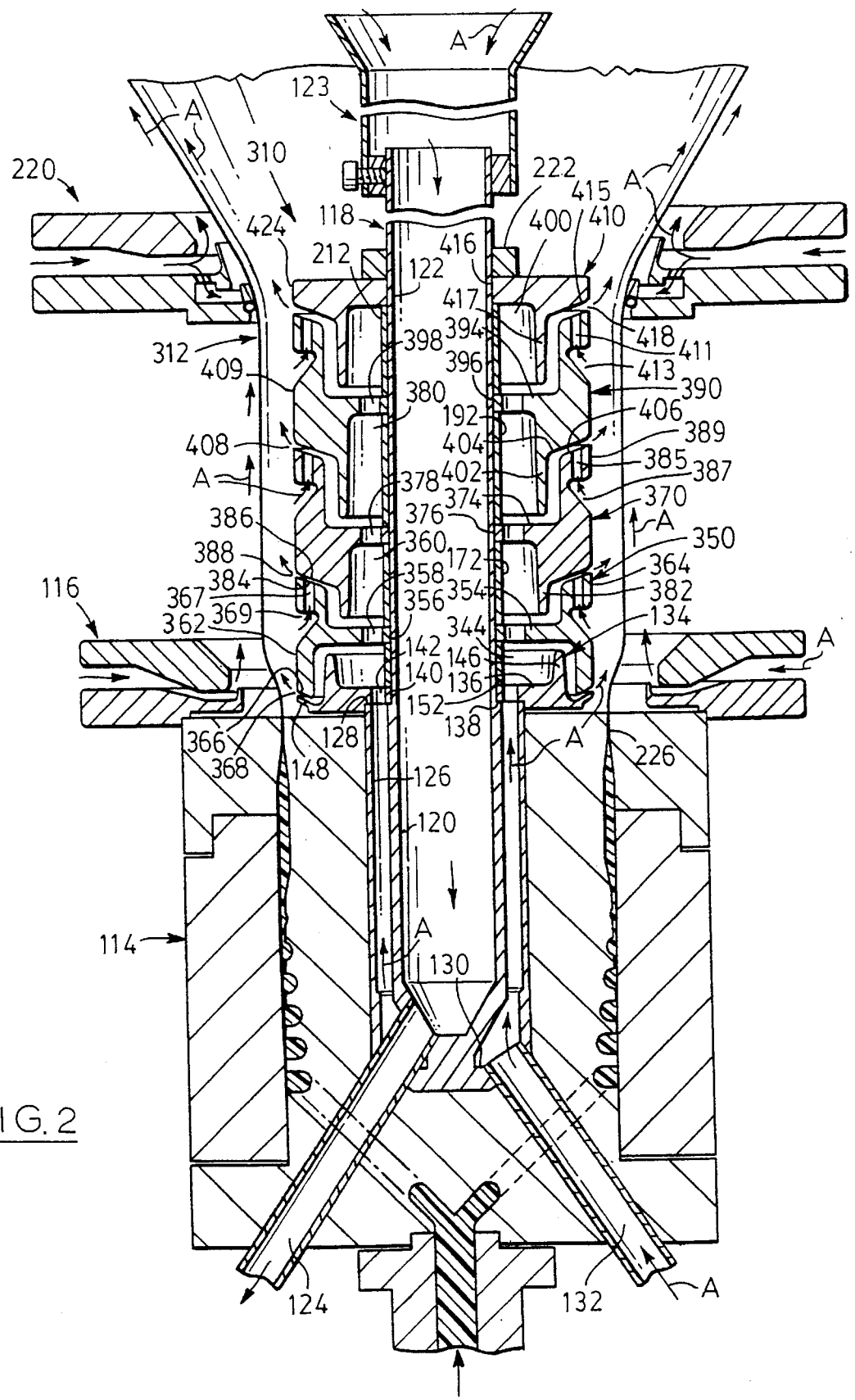
Figure 3:
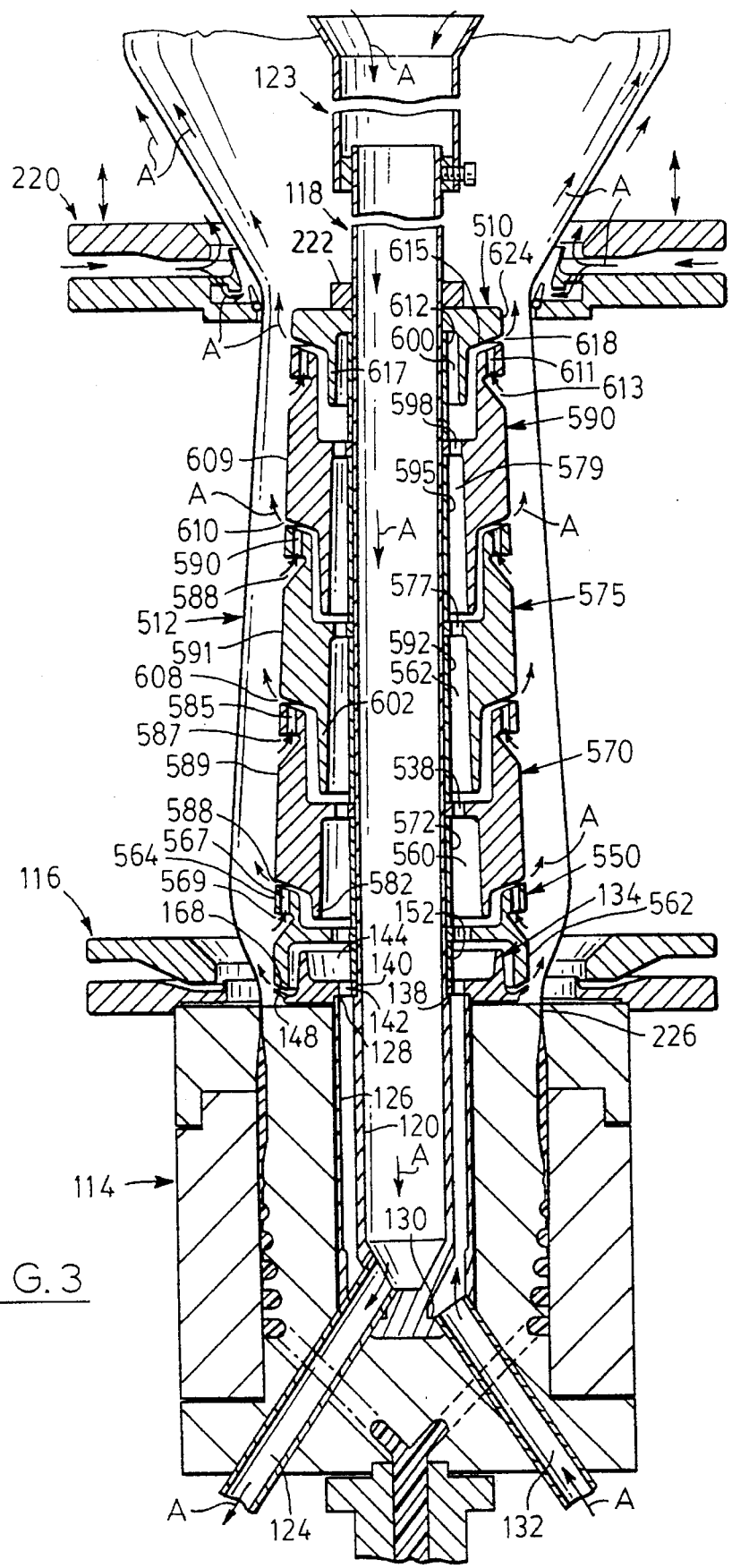

Embodiments of the invention will now be described, by way of example, with reference to the accompanying drawings, of which:

FIG. 1 is a cross-sectional view of an internal cooling air assembly in accordance with one embodiment of the invention mounted on an annular die, FIG. 2 is a similar view of an internal cooling air assembly in accordance with a second embodiment, and FIG. 3 is a similar view of an internal cooling air assembly in accordance with a third embodiment.

Referring to the drawings, FIG. 1 shows an internal cooling air assembly 110 in accordance with one embodiment of the invention provided for supplying cooling air to the interior of an extruded plastic film 112 after the film 112 has been extruded from an annular extruder 114 at an elevated temperature. Cooling air is supplied to the exterior of the film 112 by a lower external air ring assembly 116 secured to the extruder 114 so as to surround the film 112.

The construction of the lower external air ring assembly 116 is not a feature of the present invention and any suitable air ring assembly may be used. A suitable air ring assembly is described in my U.S. Pat. No. 5,464,336 issued Nov. 7, 1995, the contents of which are hereby incorporated herein by reference. The upper portion (not shown) of the tubular film 112 is then passed between the nip of a pair of rollers (not shown) so that a film bubble is formed between the die 114 and the nip of the rollers as is well known to a person skilled in the art.

The die 114 has an air removal chimney 118 with a lower portion 120 within the die 114 and an upper portion 122 extending upwardly therefrom within the tubular plastic film 112. An air removal conduit 124 extends from the lower portion 120 of the chimney 118 through the die 114 to the exterior thereof. The die 114 has an air supply sleeve 126 surrounding the chimney 118 in spaced relation thereto, the air supply sleeve 126 having an upper end 128 communicating with the internal cooling air supply assembly 110 (as will be described in more detail later) and a lower end 130 communicating with an air supply conduit 132 which extends to the exterior of the die 114 for connection to an external source of cooling air (not shown).

The internal cooling air supply assembly 110 has a lower annular member 134 slidably mounted over the upper portion 122 of the chimney 118, the lower annular member 134 having an annular central portion 136 seated on the upper end 128 of the air supply sleeve 120 and on an external shoulder 138 of the air removal chimney 118 at the junction of the lower portion 120 and the upper portion 122 thereof adjacent the die 114. The central portion 136 of the lower annular member 134 has a central aperture 140 through which the upper portion 122 of the chimney 118 passes. The central portion 136 also has a circular array of air supply apertures 142 surrounding the central aperture 140 and communicating with the interior of the air supply sleeve 126 so as to transfer cooling air from the air supply sleeve 126 to a chamber 144 above the central portion 136 of the lower annular member 134.

The lower annular member 134 also has an annular upwardly projecting wall 146 extending upwardly from the outer periphery of the central portion 136 and extending around the air supply apertures 142 at a distance therefrom, and a circumferential lip 148 radially outwardly of the annular wall 146 and extending at an upwardly and outwardly inclined angle.

The internal cooling assembly 110 also has an intermediate annular member 150 slidably mounted on the upper portion 122 of the chimney 118 above the lower annular member 134. A spacer sleeve 152 slidably mounted over the upper portion 122 of the chimney 118 is located between the intermediate annular member 150 and the lower annular member 134 to maintain a desired vertical spacing between. The intermediate annular member 150 has an annular central portion 154 with a central aperture 156 through which the upper portion 122 of the chimney passes, and a circular array of air supply apertures 158 surrounds the central aperture 156 for transferring cooling air from the chamber 144 to a further chamber 160 above the central portion 154 of the intermediate annular member 150.

The intermediate annular member 150 has a downwardly and inwardly inclined circumferentially outer wall 162 extending from the periphery of the central portion 154, and an upwardly and outwardly inclined circumferentially outer wall 164 also extending from the periphery of the central portion 154. The lower annular end 166 of the wall 162 is close to but spaced from the circumferential lip 148 of the lower annular member 134 to define an annular air supply outlet 168 which extends in an upwardly and outwardly inclined direction.

The outwardly inclined circumferential outer wall 164 has a series of upwardly directed passages 167 which extend upwardly from a circumferential recess 169 in the exterior thereof to an upper annular edge 186 thereof. The purpose of the passages 167 and circumferential groove 169 will be described later.

The cooling air assembly 110 also has a first upper annular member 170 slidably mounted on the upper portion 122 of the chimney 118 above the intermediate annular member 150. A spacer sleeve 172 slidably mounted on the upper portion 122 of the chimney 118 is located between the first upper annular member 170 and the intermediate annular member 150 to maintain a desired vertical spacing therebetween. The first upper annular member 170 has an annular central portion 174 with a central aperture 176 through which the upper portion 122 of the chimney 118 passes, and a circular array of air supply apertures 178 surrounding the central aperture 176 for transferring cooling air from the chamber 160 to a further chamber 180 above the central portion 174 of the first upper annular member 170.

The first upper annular member 170 also has an annular downwardly projecting wall 182 extending downwardly from the central portion 174 at a distance from the air supply apertures 178. The central portion 174 also has a lower annular surface 184 radially outwardly of the downwardly projecting wall 182 which extends in an upwardly and outwardly inclined direction and is close to but spaced from the upper end 186 of the outer wall 164 of the intermediate annular member 150 to define a further air supply outlet 188 which extends in an upwardly and outwardly inclined direction. The first upper annular member 170 also has an upwardly and outwardly inclined circumferential outer wall 189 which extends from the periphery of the central portion 74.

The outwardly inclined circumferential outer wall 189 has a series of upwardly directed passages 185 which extend upwardly from a circumferential recess 187 in the exterior thereof to an upper annular edge 206 thereof. The purpose of the passages 185 and circumferential groove 187 will be described later.

The cooling air assembly 110 also has a second upper annular member 190 slidably mounted on the upper portion 122 of the chimney 118 above the first upper annular member 170. A spacer sleeve 192 slidably mounted on the upper portion 122 of the chimney 118 is located between the second upper annular member 192 and the first upper annular member 170 to maintain a desired vertical spacing therebetween. The second upper annular member 190 has an annular central portion 194 with a central aperture 196 through which the upper portion 122 of the chimney passes, and a circular array of air supply apertures 198 surrounding the central aperture 196 for transferring cooling air from the chamber 180 to a further chamber 200 above the central portion 194 of the second upper annular member 190.

The second upper annular member 190 also has an annular downwardly projecting wall 202 extending downwardly from the central portion 194 at a distance from the air supply apertures 198. The central portion 194 also has a lower annular surface 204 radially outwardly of the downwardly projecting wall 202 which extends in an upwardly and outwardly inclined direction and is close to but spaced from the upper end 206 of the outer wall 164 of the first upper annular member 170 to define a further air supply outlet 208 which extends in an upwardly and outwardly inclined direction. The second upper annular member 190 also has an upwardly and outwardly inclined circumferential outer wall 209 which extends from the periphery of the central portion 194.

The outwardly inclined circumferential outer wall 209 has a series of upwardly directed passages 211 which extend upwardly from a circumferential recess 213 in the exterior thereof to an upper edge 215 thereof. The purpose of the passages 211 and the circumferential groove 213 will be described later.

The cooling air assembly 110 further has a top annular member 210 slidably mounted on the upper portion 122 of the chimney 118 above the first upper annular member 170. A spacer sleeve 212 slidably mounted on the upper portion of the chimney 118 is located between the top annular member 210 and the second upper annular member 190 to maintain a desired vertical spaced relationship therebetween. The top annular member 210 has an annular central portion 214 with a central aperture 216 through which the upper portion 122 of the chimney passes. The central portion 214 has an annular downwardly projecting wall 217 extending downwardly from the central portion 214 at a distance from the central aperture 216. The central portion 94 also has a lower annular surface 99 outwardly of the downwardly projecting wall 214 which extends horizontally and is close to but spaced from the upper end 215 of the outer wall 209 of the second upper annular member 190 to define an annular air supply outlet 218 which extends outwardly in a vertically inclined direction.

Cooling air may also be supplied to the exterior of the film 112 by a vertically movable upper external air ring assembly 220 which is located just along the top of the internal cooling air assembly 110. The actual construction of the external air ring assembly 220 is not a feature of the present invention and may be any suitable air ring assembly as is the case with the lower air ring assembly 116.

The various components of the internal cooling air assembly 110 described above, namely the lower annular member 134, the intermediate annular member 150 the first upper annular member 170, the second upper annular member 190 and the top upper annular member 210 are slidably mounted on the upper portion 122 of the chimney 118, with the lower annular member 134 engaging the upper end 128 of the air supply sleeve 126 and the shoulder 138 at the junction of the upper and lower portions 122, 120 of the air removal chimney 118. These components are retained in assembly by a clamping collar 222 surrounding the upper portion 122 of the chimney 118 and clamped thereto by a clamping bolt (not shown), the clamping collar 222 being in engagement with the top upper annular member 210.

It will be noted that the circumferential walls 162, 164, 189 and 209 of the intermediate and first and second upper annular members 150, 170, 190, together with the circumferential wall 224 of the top upper annular member 210, provide the internal cooling air assembly 110 with an upwardly and outwardly inclined peripheral sidewall, i.e. the cooling assembly 110 has an inverted frusto-conial cross-section. It will also be noted that the annular air supply outlets 168, 188, 208, 218 are directed at acute angles to the longitudinal axis of the film bubble 112.

The die 114 has an annular orifice 226, the nature of which is well known to a person skilled in the art, from which the tubular plastic film 112 is extruded. The cooling air assembly 110 is located within the tubular plastic film 112 and the external air ring assembly 220 is located on the outside of the tubular plastic film 112. Above the internal cooling air supply assembly 110, the film 112 passes between a pair of nip rollers (not shown) such that air is trapped within the film 112 between the nip rollers and die 114 to form a film bubble, as is well known in the art.

In use, as the tubular plastic film 112 is being extruded from the die 114 through the annular orifice 226, cooling air is supplied through the air supply conduit 132 and air supply sleeve 126 to the internal cooling air assembly 110. Cooling air from the upper end of the air supply sleeve 126 passes through the air supply apertures 142 in the central portion 136 of the lower annular member 134 into the chamber 144. From the chamber 144, some of the cooling air passes around the upper end of the wall 146 and then passes downwardly to flow through the annular cooling air outlet 168 so as to contact and cool the hot molten tubular plastic film 112 as the film 112 emerges from the annular extruder orifice 108, 226. The cooling air outlet 168 is relatively small so that a relatively small amount of cooling air is supplied to the still molten metal and hence relatively weak lowermost portion of the film bubble.

Other cooling air in chamber 144 passes upwardly through the air supply apertures 158 in the central portion 154 of intermediate annular member 150 into chamber 160. Some of the cooling air in chamber 160 passes downwardly around the end of the downwardly extending wall 182 to pass through the annular cooling air outlet 188 so as to contact and cool a higher and less molten portion of the film 112. The air supply outlet 188 is larger than the air supply outlet 168 so that the more cooling air is supplied to the higher and stronger portion of the film 112 than to the lower portion thereof.

Passage of air through air outlet 188 creates a venturi effect in passages 167 so as to cause relative lowering of pressure of the cooling air in circumferential extending recess 169 with the result that the film 112 is caused to travel close to the circumferential walls 162, 164 of the intermediate annular member 150.

Other cooling air in chamber 160 passes upwardly through the air supply apertures 178 in the central portion 174 of the first upper annular member 170 into the chamber 180. Some of the air in the chamber 180 passes around the end of downward extending wall 202 to pass through the cooling air outlet 208 so as to contact and cool a still higher portion of the film 112. The air supply outlet 208 is larger than air supply outlet 188 so that more air is supplied to the still harder and more stronger portion of the film 112 than to the portion of the film 112 therebelow.

Passage of air through air outlet 208 creates a venturi effect in passages 185 so as to cause a relative lowering of pressure of the cooling air in circumferential extending recess 187, with result that the film 112 is caused to travel close to the circumferential wall 189 of the first upper annular member 170.

Other cooling air in the chamber 180 passes upwardly through the air supply apertures 198 in the central portion 194 of the second upper annular member 190 into the chamber 200. Air in the chamber 200 passes around the end of downward extending wall 218 to pass through the cooling air outlet 219 so as to contact a still higher portion of the film 112. The air supply outlet 219 is larger than the air supply outlet 208 so that more air is supplied to the still harder and stronger portion of the film 112 than to the portion of the film 112 therebelow.

Passage of air through air outlet 218 creates a venturi effect in the passages 211 so as to cause a relative lowering of pressure of the cooling air in circumferentially extending recess 213 with the result that the film 112 is caused to travel close to the circumferential wall 209 of the second upper annular member 190.

Thus, the internal cooling air assembly 110 provided the film 112 with an outwardly diverging shape as it passes thereby.

It will be noted that the annular walls 146, 142, 202 and 218 are progressively increasing diameter such that the chambers 144, 160, 180 and 200 are of progressively increasing volume consistent with the diverging nature of the external walls 162, 164, 189, 209 and 224.

The Inclination of the cooling air outlets 168, 188, 208 and 218 is related to provide the desired cooling effect on the film 112 at the level of the outlet concerned.

After leaving the internal cooling air assembly 110 and cooling the interior of the film 112 as described above, air is removed from the interior of the film bubble through the air removal chimney 118 and air removal conduit 124. Cooling air will also be supplied to the exterior of the film 112 by the external air ring assembly 116 and the upper air ring assembly 220.

The embodiment shown in FIG. 2 is similar to the embodiment shown in FIG. 1 in many respects, and thus it is not necessary to describe the embodiment of FIG. 2 in great detail. For ease of understanding the embodiment of FIG. 2 compared to the embodiment of FIG. 1, like parts in FIG. 2 have been given reference numerals which are greater than corresponding reference numerals in FIG. 1 by 200, except for the extruder 114, the chimney 118 and the lower and upper outer air ring assemblies 116, 220 where these same reference numerals have been used.

In the embodiment of FIG. 1, the outer circumferential walls of the various annular members provide the internal cooling air assembly 110 with an upwardly and outwardly inclined peripheral side wall so that the film 112 has an outwardly diverging shape as it passes thereby. In the embodiment of FIG. 2, these circumferential walls 362, 364, 389 and 409 of the intermediate and first and second upper annular members 350, 370, 390, together with the circumferential wall 424 of the top annular member 410, provide the internal cooling air assembly 310 with an upward extending vertical side wall whereby the film bubble 312 has a vertical cylindrical shape as it passes thereby.

The embodiment shown in FIG. 3 is similar to the previous embodiments. Therefore, like parts in FIG. 3 have been given reference numerals which are greater than the corresponding reference numerals in FIG. 1 by 400, except as before for the extruder 114, the chimney 118, and the lower and upper outer air ring assemblies 116, 112 where the same reference numerals have been used. Also, the embodiment of FIG. 3 has an additional upper annular member 575 between the first and second upper annular members 570, 590, the additional upper annular member 575 being similar in construction thereto. Thus, the additional upper annular member 575 has a circumferential side wall 591, upward extending passages 590, a circumferential extending recess 588, cooling air transfer passages 577 communicating with chamber 579, and an air outlet 610 between the additional upward annular member 575 and the second upper annular member 590.

In the embodiment of FIG. 3, the circumferential walls 562, 564, 589, 591 and 609 of the intermediate, first, additional and second upper annular members 550, 570, 575, 590, together with the circumferential wall 624 at the top annular member 615, provide the internal cooling air assembly 510 with an upwardly and inwardly inclined side wall whereby the film bubble 512 has an upwardly converging shape as it passes thereby.

The advantages of the invention will be apparent from the foregoing description of the preferred embodiments. The amount of internal cooling air supplied can be optimized at various heights above the die. Also, the internal cooling air assembly is easily removed for cleaning purposes and if necessary can be replaced by another of a different shape and/or height.

The actual height of the upper external air ring assembly 220 can be adjusted as desired, for example as described in my U.S. Pat. No. 4,479,766 issued Oct. 30, 1984, and the top part 123 of the chimney 118 can be changed to enable the height of the chimney 118 to be adjusted.

Other embodiments of the invention will also be readily apparent to a person skilled in the art, the scope of the invention being defined in the appended claims.

I claim:

1. An internal cooling air supply assembly for supplying cooling air to the interior of an extruded tubular plastic film after the film has been extruded from an annular die at an elevated temperature, said air supply assembly comprising:

a lower annular member mountable on an annular die so as to be within extruded tubular plastic film as the film leaves the die, said die having an air supply passage to supply cooling air to the interior of the lower annular member and an air removal passage including an air removal chimney extending upwardly from the die through the lower annular member to remove air from the interior of the tubular plastic film, an intermediate annular member positionable above the lower annular member with the air removal chimney extending upwardly therethrough, said intermediate annular member forming a first chamber with the lower annular member and having an annular lower edge spaced from and co-operating with an annular upper edge of the lower annular member to form a first cooling air outlet from said first chamber, said intermediate annular member having a transfer passage for transferring cooling air from the first chamber to the interior of the intermediate annular member, and a first upper annular member positionable above the intermediate annular member with the air removal chimney extending upwardly therethrough, said upper annular member forming a second chamber with the intermediate annular member and having an annular lower edge spaced from and co-operating with an upper annular edge of the intermediate annular member to form a second cooling air outlet from the second chamber, the intermediate annular member having a first series of circumferentially spaced upwardly directed passages extending from the exterior thereof to said upper annular edge thereof whereby in use cooling air is directed onto the interior of the film from the first and second chambers through the first and second cooling air outlets respectively and cooling air passing through the second cooling air outlet draws cooling air through said first series of inwardly directed passages from the exterior of the intermediate annular member to create suction which draws the film close to the intermediate annular member.

2. A cooling air assembly according to claim 1 wherein said lower, intermediate and first upper annular members form an upwardly and outwardly inclined side wall through which the first and second cooling outlets pass whereby the film bubble has an outwardly diverging shape as it passes thereby.

3. A cooling air assembly according to claim 1 wherein said lower, intermediate and first upper annular member form an upwardly extending vertical side wall through which the first and second cooling air outlets pass whereby the film has a vertical cylindrical shape as it passes thereby.

4. A cooling assembly according to claim 1 wherein said lower, intermediate and first upper annular member form an upwardly and inwardly inclined side wall through which the first and second cooling outlets pass whereby the film has an upwardly converging shape as it passes thereby.

5. A cooling air supply assembly according to claim 1 also including a further upper annular member positionable above the first upper annular member with the air removal chimney extending upwardly therethrough, said further upper annular member forming an third chamber with the first upper annular member and having an annular lower edge spaced from and co-operating with an upper annular edge of the first upper annular member to form a third cooling air outlet from the third chamber, said first upper annular member having a transfer passage for transferring cooling air from the interior of the intermediate annular member to the interior of the further upper annular member, the first upper annular member having a second series of circumferentially spaced upwardly directed passages extending from the exterior thereof to said upper annular edge thereof whereby in use cooling air is also directed on the interior of the film from the third chamber through the third cooling air outlet and cooling air passing through the third cooling air outlet draws cooling air through said second series of upwardly directed passages from the exterior of the first upper annular member to create suction which draws the film close to the first upper annular member.

6. A cooling air supply apparatus for supplying cooling air to an extruded tubular plastic film after the film has been extruded from an annular die at an elevated temperature, said air supply apparatus comprising:

an internal cooling air supply assembly according to claim 1 mounted on an annular die so as to be within extruded tubular plastic film as the film leaves the die, a lower external cooling air ring assembly mounted on the die so as to surround the tubular plastic film as the film leaves the die and supply cooling air onto the exterior surface of the tubular plastic film, and an upper external cooling air ring assembly mounted adjacent an upper end of the internal cooling air supply assembly so as to surround the tubular plastic film and supply cooling air to the exterior surface thereof.

7. A cooling air supply apparatus according to claim 6 wherein the chimney has an upper end portion which is adjustable in height to accommodate interior cooling air assemblies of different heights, and the upper external air ring assembly is vertically movable to accommodate changes of internal cooling air supply assembly from one height to another.

8. A cooling air supply apparatus according to claim 6 wherein the internal cooling air supply assembly has an outer wall which extends in an upwardly and outwardly inclined direction adjacent to the tubular plastic film.

9. A cooling air supply apparatus according to claim 6 wherein the internal cooling air supply assembly has an outer wall which extends in a substantially vertical direction adjacent to the tubular plastic film.

10. A cooling air supply apparatus according to claim 6 wherein the internal cooling air supply assembly has an outer wall which extends in an upwardly and inwardly inclined direction adjacent the tubular plastic film.

* * * * *